US006526650B2

(12) United States Patent
Gaskin

(10) Patent No.: US 6,526,650 B2
(45) Date of Patent: Mar. 4, 2003

(54) FEED HEAD

(75) Inventor: Ian Gaskin, Kent (GB)

(73) Assignee: BAS Components Limited (GB)

( * ) Notice: Subject to any disclaimer, the term of this patent is extended or adjusted under 35 U.S.C. 154(b) by 0 days.

(21) Appl. No.: 09/739,290

(22) Filed: Dec. 19, 2000

(65) Prior Publication Data

US 2001/0022016 A1 Sep. 20, 2001

(51) Int. Cl.[7] .......................... B23Q 15/00; B23P 21/00
(52) U.S. Cl. ......................... 29/715; 29/716; 29/798; 29/809
(58) Field of Search ..................... 29/432, 715, 716, 29/798, 809, 243.529, 243.517

(56) References Cited

U.S. PATENT DOCUMENTS

| 3,946,478 | A | * | 3/1976 | Goodsmith et al. ............ 29/798 |
| 3,971,116 | A | * | 7/1976 | Goodsmith et al. ............ 29/798 |
| 4,164,072 | A | * | 8/1979 | Shinjo .......................... 29/720 |
| 4,242,793 | A | * | 1/1981 | Matthews et al. ............. 29/798 |
| 4,348,796 | A | * | 9/1982 | Smallegan .................... 29/432 |
| 4,442,584 | A | * | 4/1984 | Smallegan .................... 29/432 |
| 4,998,659 | A | * | 3/1991 | Goodsmith et al. ............ 227/7 |
| 5,360,137 | A | * | 11/1994 | Shinjo et al. ................. 221/238 |
| 5,619,788 | A | * | 4/1997 | Schmidt ....................... 29/798 |
| 5,887,339 | A | | 3/1999 | Schmidt |
| 6,401,331 | B1 | * | 6/2002 | Mizuno ........................ 29/771 |
| 6,442,830 | B1 | * | 9/2002 | Vrana .......................... 29/715 |
| 6,446,833 | B1 | * | 9/2002 | Morishima et al. ......... 221/268 |

FOREIGN PATENT DOCUMENTS

GB         A1474766         5/1973

* cited by examiner

Primary Examiner—Gregory M. Vidovich
Assistant Examiner—Essama Omgba
(74) Attorney, Agent, or Firm—Finnegan, Henderson, Farabow, Garrett & Dunner, L.L.P.

(57) ABSTRACT

A feed head has a delivery path along which nuts are fed to a pressing station in the feed head, the pressing station having a pressing die which is reciprocated transversely to the delivery path under the action of a press to fasten a nut to a sheet metal member. A cam is provided to reciprocate the pressing die manually to facilitate clearance of blockages in the feed head, and also to hold the pressing die in its lowered position to allow operation of the press without operating the die. A sensor for detecting nuts at the pressing station is positioned on the end of the delivery path, enabling a narrower feed head design. A electrical coupling and nut delivery tube are integrated to facilitate connection in confined spaces.

6 Claims, 2 Drawing Sheets

FEED HEAD

INTRODUCTION AND BACKGROUND

The present invention relates to a feed head for receiving nuts which are to be fixed to sheet material in a pressing operation. GB-A-1 474 766 describes a nut which is attached to sheet metal by a pressing operation. The nut has a tubular end which is pressed into an aperture in the sheet metal, deforming the rim of the aperture into a cylinder to embrace the periphery of the nut. The tubular end is turned around the rim to secure the nut against removal, while a flange at the other end of the nut prevents the nut being pushed completely through the aperture. Such nuts are sold by the present applicants under the trade mark FLANGEFORM.

To increase production speeds when attaching the nuts to sheet material, the applicants have developed a feed head for receiving the nuts and feeding them one at a time to a pressing station.

The feed head needs to be robust enough to withstand the forces exerted in a pressing operation; compact enough to fit easily in a press, to be reliable in operation; and to be easily maintained. A particular difficulty occurs when feeding nuts to the pressing station in that the orientation of nuts is not readily controlled. Thus, it is important to be able to gain access to the feed head and pressing station to remove any nuts which are blocking the feed head.

SUMMARY OF THE INVENTION

A first aspect of the invention provides a feed head having a delivery path along which nuts are fed to a pressing station in the feed head, the pressing station having a pressing die which is reciprocated transversely to the delivery path under the action of a press to fasten a nut to a sheet metal member, wherein means is provided to reciprocate the pressing die manually.

Preferably the means for reciprocating the pressing die comprises a cam which bears on a surface coupled to the die and is rotated to move the die against the force of a return spring.

By providing for manual operation of the pressing die, the procedure for clearing the feed head of any obstruction, such as a wrongly oriented nut is greatly facilitated.

Preferably, the cam can be used to hold the pressing die in its depressed position. This allows for the press to be operated without operation of the feed head.

Another aspect of the invention provides a feed head having a delivery path along which nuts are fed to a pressing station in the feed head, in which a sensor is provided at the end of the delivery path, at the pressing station, to detect the presence of a nut.

By positioning the sensor at the end of the delivery path, rather than to one side, the feed head can be made narrower at the pressing station, allowing multiple feed heads to be used close together.

Another aspect of the invention provides a feed head having a delivery path along which nuts are fed to a pressing station in the feed head, in which a first sensor is provided at the pressing station and a second sensor is provided up stream of the feed head. By providing the second sensor up stream of the feed head it is possible to detect problems before a nut arrives, or is due to arrive, at the pressing station, which provides for better control.

Another aspect of the invention provides a feed head having a delivery path along which nuts are fed to a pressing station in the feed head, comprising a delivery tube connected to the delivery path for delivering nuts to the delivery path, and an electrical connector for connecting sensors in the feed head to external components, wherein the delivery tube and electrical connector are integrated. Providing a single, integrated connector greatly facilitates connection and disconnection of the feed head to ancillary equipment, the nut feeder and control electronics, allowing for the feed head to be mounted in a space with restricted access.

BRIEF DESCRIPTION OF THE DRAWINGS

Other aspects, preferred features and advantages of the invention will be apparent from the following description and the accompanying claims.

In the drawings.

DESCRIPTION OF THE PREFERRED EMBODIMENT

Figure 1:
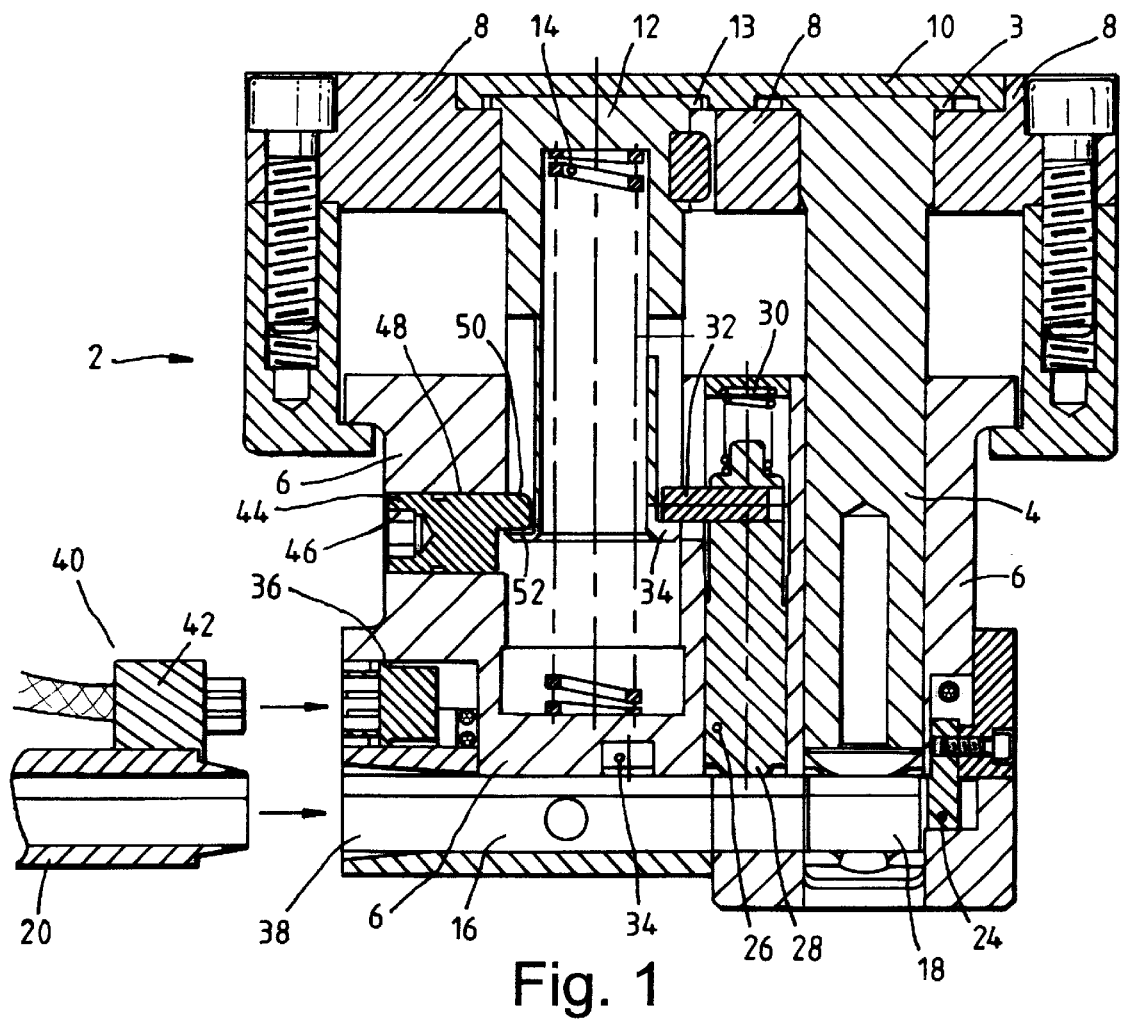
FIG. 1 is a cross-section through a feed head forming an embodiment of the invention, along line I—I of FIG. 2.

Referring to FIG. 1, a feed head 2 has a pressing die 4 which is shown in its uppermost position. The pressing die 4 reciprocates in a stationary feed head body 6. The pressing die 4 has a peripheral flange at its upper end held between a collar 8 and a cover plate 10. A hollow cylinder 12 is also held by a flange 13 at its upper end between the cover plate 10 and collar 8. A spring 14 urges the cylinder 12 upwards, and hence the cover plate 10, collar 8 and pressing die 4. A press (not shown) presses down on the cover plate 10 to urge the die 4 downwards against the force of the spring 14.

A delivery path 16 is provided at the bottom of the body 6 and ends at 18 under the pressing die 4.

Figure 2:
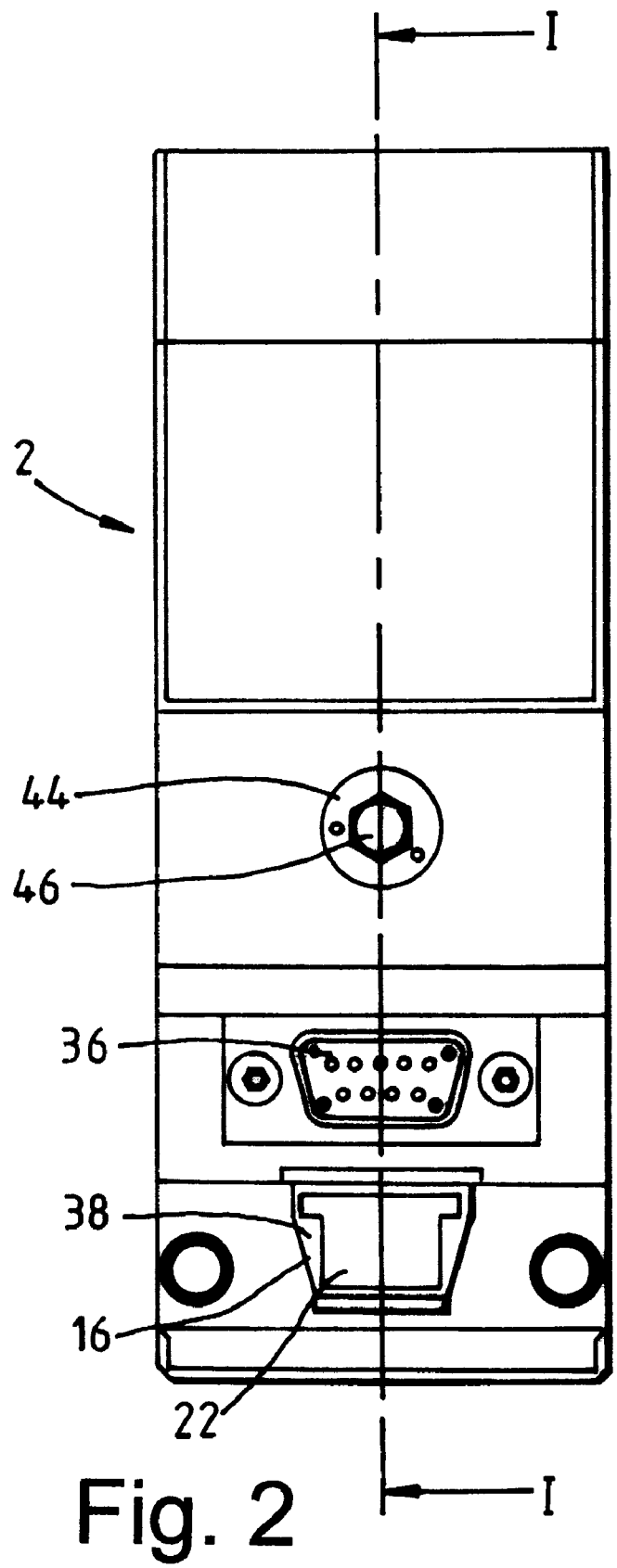
FIG. 2 is an end view of the feed head of FIG. 1.

Nuts are fed along the delivery path 16 from a delivery tube 20 which in turn is filled from a parts feeder (not shown). As seen in FIG. 2, delivery path 16 is trapezium shaped, being wider at the upper part to receive a laterally extending flange of a nut 22, seen in FIG. 2, and to maintain the orientation of nuts 22 as they pass along the path 16.

In operation, nuts 22 are urged along the delivery path 16 from the parts feeder. When a nut reaches the end 18 of the delivery path 16 it is sensed by a sensor 24 which sends a signal to the press to indicate that the feed head is ready for a pressing operation. The press bears on the plate 10, to depress the die 4, and hence urge the nut downwards onto the sheet metal part (not shown) to which the nut is to be fixed. A co-operating die (also not shown) sits under the sheet metal part to deform the nut 22 as it penetrates an aperture in the sheet metal part and so secure the nut in place.

Immediately upstream of the pressing die 4 is a locating pin 26. Pin 26 has a nose 28 which serves to locate and centralise or orient the penultimate nut in the delivery path 16. Pin 26 is urged downwards by a spring 30, but held by a cross-pin 32 which extends from the pin 26 and bears on a flange 34 at the bottom of the cylinder 12. As cylinder 12 is lowered (when the press bears on cover plate 10), spring 30 extends to urge the pin 28 downwards.

Further upstream of pin 26 is a second sensor 34 which serves to detect the ante-penultimate nut in the delivery path 16.

Sensors 24, 34 are wired to an electrical outlet connector 36 which is located immediately above the inlet end 38 of the delivery path 16.

An integrated connector 40 comprises a complementary electrical connector 42 to mate with a connector 36, and delivery tube 20 which mates with the inlet end 30 of delivery path 16.

Above the connector 36 is a cam 44. Cam 44 has an exposed hexagonal socket 46 and rotates in a circular bore 48 in the body 6. At the other end of the cam 44 is a nose 50 which engages a flange 52 at the bottom end of the cylinder 12. As the cam 44 is manually rotated, by means of a hexagon key inserted in the bore 46, the nose 50 rotates and so urges the cylinder 12 downwards against the force of the spring 14, and hence also pulls the pressing die 4 downwards. It will be appreciated that when the cam 44 is rotated through 180 degrees, the nose 50 reaches the bottom of its travel, and the cam can be temporarily "locked" in this position, for example by a small flat provided on the nose 40 where it engages the flange 52.

In use, the feed head 2 is installed a press, and is connected to a parts feeder and control system via connector 40. Nuts 22 are fed from a parts feeder along delivery tube 20. The parts feeder is controlled by signals from sensors 24, 34 which indicate the presence of nuts in the delivery path 16. The press is sent a "ready" signal when a nut is detected by sensor 24.

In the event of a jam in the delivery path, or elsewhere in the system, the pressing die 4 can be actuated manually, by rotation of cam 44, to eject nuts from the delivery path 16. Also, if it is desired to operate the press without actuation of the feed head pressing die 4, the die 4 can be held in its lowered position by cam 20.

By locating the sensor 24 at the axial end of the delivery path 16, the feed head can be made narrow, as seen in FIG. 2. Thus multiple feed heads can be spaced close together.

What I claim is:

1. A feed head, comprising: a pressing station; and a delivery path along which nuts are fed to the pressing station in the feed head, the pressing station including a pressing die which is reciprocated transversely to the delivery path under the action of a press to fasten a nut to a sheet metal member, wherein means is provided to manually reciprocate the pressing die independently of the press.

2. A feed head as claimed in claim 1, wherein the means for reciprocating the die manually is a cam which bears on a surface coupled to the die, and is manually rotated to move the die against the force of a return spring.

3. A feed head as claimed in claim 2, wherein the cam is rotatable between a first stable position allowing normal operation of the pressing die, and a second stable position holding the die in a depressed position.

4. A feed head having a delivery path along which nuts are fed to a pressing station in the feed head, comprising a delivery tube connected to the delivery path for delivering the nuts to the delivery path, and an electrical connector for connecting sensors in the feed head to external components, wherein the delivery tube and the electrical connector are integrated.

5. A feed head for installing nuts in a sheet metal member, the feed head comprising:

a pressing station at one end;

a delivery path leading to the pressing station and along which the nuts are fed to the pressing station, the pressing station including a pressing die which is reciprocable transversely of the delivery path under the action of a press and a return spring to move a nut from the delivery path on to said sheet metal member and press the nut into engagement with the sheet metal member to fasten the nut thereto; and a manually rotatable cam, the cam being accessible from another end of the feed head distal of the pressing station and manually rotatable by means of a tool engageable with the cam by an operator, the cam bearing on a surface coupled to the pressing die such that the rotation of the cam moves the pressing die against the force of the return spring thereby to manually reciprocate the pressing die.

6. A feed head, comprising:

a pressing station including a pressing die;

a delivery path including an inlet end and along which nuts are fed from the inlet end to the pressing station;

an electrically operated sensor for sensing the position of a nut in the feed head and a first electrical connector positioned on the feed head adjacent the delivery path inlet end for outputting signals from the sensor;

a delivery tube for delivering the nuts to the inlet end of the delivery path, an outlet end of the delivery tube being removably coupled to the inlet end of the delivery path; and an electrical wiring for feeding electrical signals from the electrical connector to an external apparatus, the electrical wiring being terminated in a second electrical connector which is removably mateable with the first electrical connector, wherein the delivery tube outlet end and the second electrical connector are integrated for an operator to simultaneously couple the delivery tube outlet and the second electrical connector with the delivery path inlet end and the first electrical connector respectively.

* * * * *

UNITED STATES PATENT AND TRADEMARK OFFICE
CERTIFICATE OF CORRECTION

PATENT NO.    : 6,526,650 B2
DATED         : March 4, 2003
INVENTOR(S)   : Ian Gaskin It is certified that error appears in the above-identified patent and that said Letters Patent is hereby corrected as shown below:

<u>Title page,</u>
Item [57], ABSTRACT,
Line 11, "A electrical" should read -- An electrical --.

Signed and Sealed this

Fourth Day of November, 2003

JAMES E. ROGAN
*Director of the United States Patent and Trademark Office*